United States Patent
Schaffner et al.

(10) Patent No.: US 9,667,699 B2
(45) Date of Patent: May 30, 2017

(54) METHOD FOR TRANSMITTING DATA VIA A CANOPEN BUS

(75) Inventors: Heinz Schaffner, Rödermark (FR); Pascal Hampikian, Paris (FR)

(73) Assignee: SCHNEIDER ELECTRIC AUTOMATION GMBH, Seligenstadt (DE)

(*) Notice: Subject to any disclaimer, the term of this patent is extended or adjusted under 35 U.S.C. 154(b) by 531 days.

(21) Appl. No.: 13/638,604

(22) PCT Filed: Mar. 29, 2011

(86) PCT No.: PCT/EP2011/054872
§ 371 (c)(1),
(2), (4) Date: Nov. 28, 2012

(87) PCT Pub. No.: WO2011/120999
PCT Pub. Date: Oct. 6, 2011

(65) Prior Publication Data
US 2013/0080585 A1    Mar. 28, 2013

(30) Foreign Application Priority Data
Mar. 31, 2010   (DE) ................. 10 2010 016 283

(51) Int. Cl.
G06F 15/16    (2006.01)
H04J 3/16     (2006.01)
H04L 29/08    (2006.01)

(52) U.S. Cl.
CPC .............. H04L 67/10 (2013.01); H04L 67/12 (2013.01); H04L 67/34 (2013.01)

(58) Field of Classification Search
CPC ............... H04L 29/06; H04L 29/08072; H04L 29/06095; H04L 29/06068; H04L 29/0809; H04Q 11/0478; H04J 3/1617

(Continued)

(56) References Cited

U.S. PATENT DOCUMENTS 7,627,704 B2 * 12/2009 Croyle ................. G06F 13/387
                                                  710/104
2005/0002417 A1 * 1/2005 Kelly ..................... H04L 69/08
                                                  370/466

(Continued)

FOREIGN PATENT DOCUMENTS

CN    201298168 Y    8/2009
CN    101592940 A   12/2009
EP     1494417 A2    1/2005

OTHER PUBLICATIONS

Gateway profiles connecting CANopen and Ethernet, ICC-CAN in Automation, 2005.*

(Continued)

*Primary Examiner* — Mahran Abu Roumi
(74) *Attorney, Agent, or Firm* — Ladas & Parry LLP (57) ABSTRACT

The invention relates to a method for transmitting data between a first automation appliance, and at least one second automation appliance, via a CANopen bus using a service data object as an SDO service, wherein an SDO client implemented in the first automation appliance is used to send a download or upload request to an SDO server implemented in the at least one second automation appliance, wherein the data are encapsulated in a CANopen frame by an application implemented in the first automation appliance or the at least one second automation appliance wherein the CANopen frame with the encapsulated data is transmitted or sent by means of an SDO service into or out of a data tunnel object defined in an object dictionary of the SDO server, and wherein the encapsulated data are decapsulated by the application implemented in the first or the at least one second automation appliance.

10 Claims, 8 Drawing Sheets

(58) Field of Classification Search
USPC .......................................................... 709/230
See application file for complete search history.

(56) References Cited

U.S. PATENT DOCUMENTS

2005/0256964 A1* 11/2005 Dube ...................... H04L 67/02
 709/230
2010/0007311 A1* 1/2010 Colin .................. H01M 10/482
 320/134

OTHER PUBLICATIONS

Chinese Office Action dated Sep. 24, 2014, corresponding to Chinese Patent Application 201180017414.

* cited by examiner

METHOD FOR TRANSMITTING DATA VIA A CANOPEN BUS

This application is a 371 of PCT/EP2011/054872 filed on Mar. 29, 2011, which claims priority to German patent application number 10 2010 016 283.3, filed Mar. 31, 2010.

FIELD OF THE INVENTION

The present invention relates to a method for transmitting data between a first automation device, such as a user PC or a central control device, and at least one second automation device, such as a field device, via a CANopen bus using a service data object as a SDO service, wherein an SDO client implemented in the first automation device is used to send a download or upload request to a SDO server implemented in the at least one second automation device, wherein the data are encapsulated in a CANopen frame by an application implemented in the first automation device or the at least one second automation device, wherein the CANopen frame with the encapsulated data is transmitted or sent by means of a SDO service into or out of a data tunnel object defined in an object directory of the SDO server, and wherein the encapsulated data are decapsulated by the application implemented in the first or the at least one second automation device.

BACKGROUND OF THE INVENTION

A method of the aforementioned kind is described in US patent application US-A-2010/0007311. This application relates to a battery module comprising cells, two external connections, a message-communication-infrastructure, a module control unit with a message processing unit that is connected to the infrastructure in order to send and receive messages. A method is described for transmitting data between a control device and modules via a CANopen bus. Data is transmitted by using a service data object as a SDO service. In this configuration the modules and the control device function as the SDO client.

The US patent application US-A-2005/0002417 relates to systems and methods for executing protocol conversions in an environment, comprising a work machine with one or more modules that are coupled to one another via one or more data connections. Such systems and methods can have one or more gateways for executing "tunneling" or "bridging" operations. "Tunneling" processes can include receiving a message from a source module in a first protocol, decapsulating the messages in the transmission units of a second protocol and transmission of the decapsulated message via the second protocol.

CANopen was developed by the CiA (CAN in Automation), a user and manufacturer's association for CANopen, and available as European Standard EN 50325-4 since the end of 2002. CANopen utilizes as transmission technology the layers 1 and 2 of CAN standard (ISO 11898-2) originally developed for use in automobiles.

In CANopen, several basic services (service primitives) are defined. These basic services are:
Request: Request of a CANopen service by an application
Indication: Report to the application that a result or a specific message is present
Response: Response of the application to an indication
Confirmation: Confirmation to the application that a CANopen service has been executed.

The manner in which CANopen devices exchange data with one another is regulated via a CANopen communication profile. As with all other field bus protocols, a distinction is made between real-time data and parameter data. CANopen assigns suitable communication elements or communication objects to each of these data types, which are completely different in character.

The communication objects can be subdivided as follows:
Service data objects (SDO) for parameterizing device object dictionary entries
Process data objects (PDO) for transporting real-time data
Network management objects (NMT) for status control of the CANopen device and for account monitoring,
additional objects such as synchronization objects, time stamping and error messages.

All communication objects and all user objects are compiled in an object dictionary (English: Object Dictionary (OD)). The object dictionary in the CANopen device model is the link between the application and the CANopen communication unit. Each entry in the object dictionary stands for an object and is characterized by an index, such as a 16-bit index. An index can in turn contain up to 265 subindicies. In this way it is possible, independent of the "11-bit identifier", to differentiate up to 65.536×254 elements.

In the communication profiles the allocation of communication and device object profiles for a respective index is precisely defined. Thus, the object dictionary defines a distinct interface between the application and the outward communication. For example, for each CANopen node in the network it is known that the "heart beat interval" is found at index 1017 h, and any node or any configuration program has read or write access to it.

For each communication object there exists a distinct COB-ID (communication object identifier) in the network. The CO-ID consists of 32 bit values, in which each of the first two bits can have an object-specific meaning In an 11-bit CANnetwork the following 19 bits (29 to 11) have the value 0 and the last bits (10 to 0) correspond to the CAN identifier.

Service data objects (SDO) provide a service for accessing the object dictionary. Each CANopen device requires at least one SDO server which receives and processes requests from other devices. The default settings utilize messages to the SDO server of a device, the node number of the receiver plus 1536 as COB-ID or as "identifier" for the CAN message. The node number of the transmitter plus 1408 is used as "identifier" for the response by the SDO server. These relatively high, and thus low prioritized, IDs are used to transfer entries into the object dictionary. A protocol for this SDO transfer exists which requires, for example 4 bytes in order to encode the direction of data transfer, the index and the subindex. Hence, only 4 bytes of the 8 bytes of a CAN data field remain for data content. For objects that are larger than 4 bytes there are two additional protocols for fragmented transfer of data.

In contrast to the prioritized SDO transfer overloaded with protocol data, the process data object (PDO) provides a faster option for transferring process data.

The identifiers used for PDO transfer for the default settings are in the COB-ID range of 385 to 1407, and are therefore prioritized higher than the SDO messages. In addition, they only contain user data, hence 8 bytes are available.

The content of the user data is determined via PDO mapping entries. These are objects in the object dictionary which, like an allocation table, determine which data are transmitted via a PDO. This data is in turn the content of other objects of the object dictionary. In a PDO the values of multiple objects may also be transmitted and the receivers of the PDO can in accordance with their PDO mapping entries utilize only parts of the data.

Once a PDO is received the data are in turn written, respectively, in other objects of the object dictionary in accordance with the mapping entries, for example, in a digital output object. PDOs can be transmitted cyclically, event-oriented, per request or synchronized.

The MODBUS protocol is a communication protocol based on a master-slave or client-server architecture. It was developed in 1979 by Gould Modicon for communicating with programmable logic controllers. The MODBUS, since it is an open protocol, has become a de facto standard in the industry.

A master, for example, a PC and multiple slaves (for example, measurement and control systems; field devices) can be connected by means of MODBUS. There are two versions: one for the serial interface (EIA-232 and EIA-485) and one for Ethernet.

In data transmission a distinction is made between three different types of operations:
MODBUS ASCII
MODBUS RTU
MODBUS TCP.

Each bus device must have a specific address.

CANopen, MODBUS, PROFIBUS and Ethernet-based networks are used in automation technology to establish communication between data processing systems and peripheral devices. For example, programmable logic controllers (PLC), fieldbus couplers, IO/-modules, drive controllers (motion controllers), display devices are coupled to one another over a local network (field bus). Field devices that are linked to a MODBUS include a MODBUS interpreter in order to interpret the MODBUS messages transmitted over MODBUS.

As a general rule, prior art systems and methods enable parameterization of field devices by means of configuration files, in which certain predefined functionalities of the respective device, depending on the need and the range of application of the device, can only be switched on or off, or are activated or deactivated.

Parameterization and/or configuration usually occurs by way of a direct connection between a data processing device such as a PC (personal computer), laptop or PDA (personal digital assistant) and the field device by transmitting a MODBUS message which can be interpreted in the field device. The configuration of each individual field device via a one-to-one connection is costly and time consuming.

When using a field device of this type with a MODBUS interface in a CANopen fieldbus, the problem arises that the CANopen messages cannot be evaluated by the MODBUS interface.

On the other hand, application data and application parameters of a CANopen device are present as objects in the CANopen that are stored in the CANopen object dictionary.

If an application requires more data/parameters than are present in the CANopen object dictionary, it is impossible to access such information via a CANopen network.

Based on the foregoing, the object of the present invention is to further develop a method of the aforementioned kind that simplifies the configuration of field devices to CANopen.

The object is achieved in accordance with the present invention inter alia in that the method is used for configuring and/or parameterizing via the CANopen bus the at least one second automation device that includes a MODBUS server, in that the data are generated as configuration and/or parameterization data in the form of a MODBUS frame and are encapsulated in the CANopen frame, and in that the CANopen frame is loaded by means of a SDO-download into the data tunnel object of the SDO server of the at least one second automation device and is decapsulated.

The method according to the present invention makes it possible to encapsulate messages such as MODBUS messages in a CANopen message. The encapsulation or tunneling of device-specific data, such as configuration and/or parameterization data enables automation devices to be configured via the CANopen bus from a central location such as a user PC or central controller, which only have access to an interface different from CANopen, such as a MODBUS interface for processing the device-specific data, and which according to the prior art would have to have been configured via a one-to-one connection.

The method according to the present invention can thus be utilized to configure and/or parameterize by way of a CANopen bus field devices that include a MODBUS server, wherein configuration and/or parameterization data are encapsulated as a MODBUS frame in a CANopen frame, which is loaded by means of a SDO-download into the data tunnel object of a field object and decapsulated.

A preferred method is distinguished by the fact that a data transmission is carried out from the first automation device to the at least one second automation device by way of a SDO download to a data tunnel object of the object dictionary, initiated by the application implemented in the first automation device.

According to another preferred method, it is provided that data transmission is carried out from the at least one second automation device to the first automation device by way of a SDO download to a data tunnel object of the object dictionary, initiated by the application implemented in the first automation device, wherein the application addresses cyclically the application in the at least one second automation device.

To transmit data, a preset SDO server channel can be preferably used, whereby a second SDO server channel is used if the transmission rates of encapsulated data are high.

The method is further distinguished by the fact that a single data tunnel object is sufficient for simplex or half-duplex data transmission. For full duplex data transmission at least two data tunnel objects are used in the object dictionary of the SDO server.

For parameterizing and/or configuring field devices by way of a CANopen bus, it is provided that the application implemented in the first automation device comprise a field device tool and at least one device type manager which are used to generate parameterization and/or configuration data in the form of a MODBUS frame, that the MODUBUS frame is encapsulated in a CANopen frame and that the CANopen frame is transmitted by means of a SDO download into the data tunnel object of the SDO server of the at least one second automation device.

When transmitting data from the at least one second automation device to the first automation device, it is necessary for a protocol-specific part of the device type manager implemented in the first automation device to regularly query the at least one second automation device with the application, wherein a CANopen communication DTM implemented in the application executes the SDO upload request.

The data tunnel object is preferably domain type.

To transmit data to a plurality of field devices linked to a CANopen bus, the CANopen frame with the encapsulated MODBUS frame is sent via a routing functionality implemented in the first automation device to the at least one second automation device with the appropriate address.

As encapsulated data, it is preferable to send parameter and/or configuration data in addition to control programs.

Data can be transmitted sequentially for each of the two automation devices and/or transmitted when one of the two automation devices is connected to the CANopen bus.

Further details, advantages and features of the invention are set forth in the claims, the features by themselves or in combination taken therefrom, as well as preferred embodiments taken from the following description of the drawings.

DETAILED DESCRIPTION OF THE INVENTION

Figure 1:
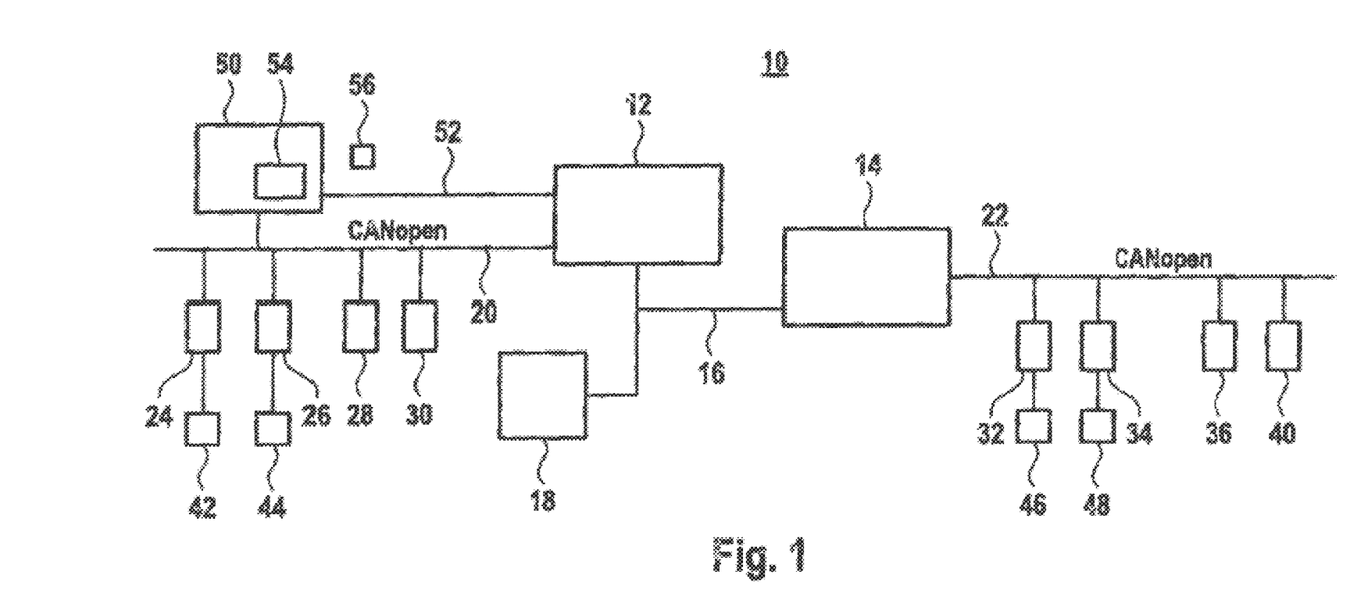
FIG. 1 is a structure of an automation system.

FIG. 1 shows purely schematically an automation system which, in the exemplary embodiment shown, comprises logic controllers 12, 14, connected to one another by way of an Ethernet network 16. Also provided is an operator terminal in the form of an HMI controller 18 which is also connected to the Ethernet network 16.

The logic controllers 12, 14 are each connected via a CANopen bus 20, fieldbus devices 24, 26, 28, 30 and 32, 34, 36, 40. The fieldbus devices 24, 26, and 32, 34 can be, for example, drive controllers for activating drives or motion controllers. The fieldbus devices 28, 30 and 36, 40 can be realized as input/output devices.

To configure the controllers 12, 14, 18 and/or the fieldbus devices 24-40 the controller 12 is connected by way of a single connection 52 to a configuration PC 50. In the exemplary embodiment described, the connection is configured as an USB connection.

In the configuration PC 50 a software tool 54 is implemented for configuring and/or parameterizing the controllers 14, 15, 18 and/or the field devices 24-40. Using the software tool, device description files 56 can be generated which can be transmitted via the USB connection 52, the controllers 12, 14 and the CANopen buses 20, 24 to the fieldbus devices 24-40, and there interpreted and executed.

In order to also use fieldbus devices at the CANopen bus 20, 22 which have a MODBUS interface for interpreting a device description file and are normally configured and/or parameterized via a MODBUS interface, the present invention provides that data are transmitted, for example, in the form of device description files encapsulated via the CANopen bus 20, 22.

Figure 2:
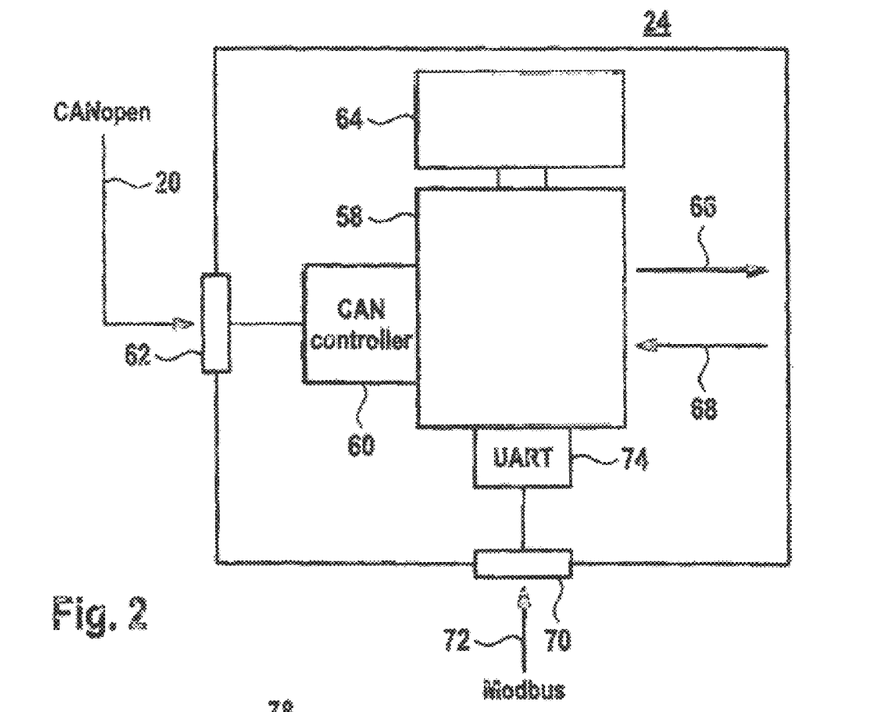
FIG. 2 is a hardware block diagram of a field device.

FIG. 2 shows purely schematically the hardware structure of a fieldbus device as exemplified by fieldbus device 24. The latter comprises essentially a data processing unit 58, such as a microcontroller connected via a communication interface 60, such as a CAN controller, with the CANopen bus 20. A plug connector 62 is provided for connecting the CANopen bus 20.

The microcontroller 58 is connected to a storage element 64 for storing programs and/or data. In addition, interfaces 66, 68 are provided for peripheral devices.

In addition to the connection 62 for the CANopen bus 20, the field device 24 shown also has a port 70 for connection with a MODBUS 72 by way of which the fieldbus device 24 can be configured. The MODBUS 72 is coupled to the microcontroller 58 via an interface 74, such as UART.

Figure 3:
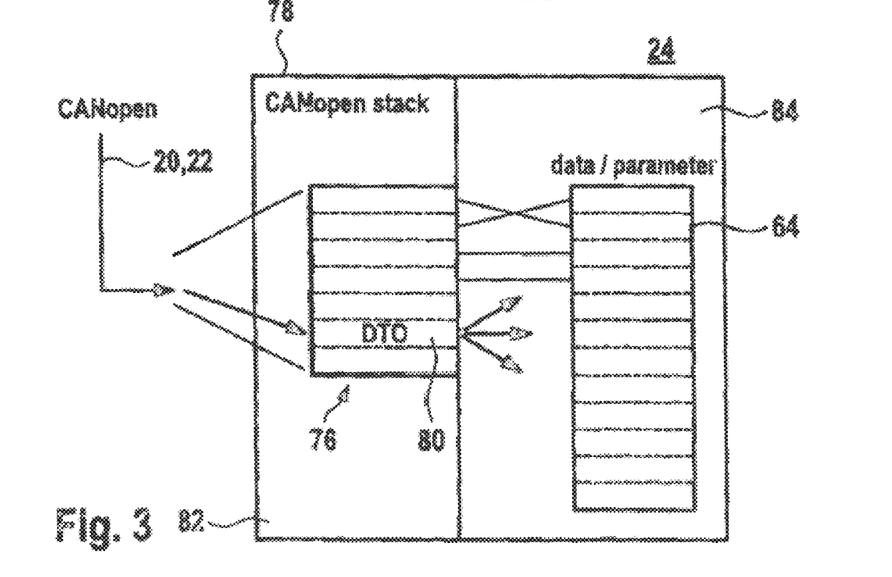
FIG. 3 is a schematic representation of the encapsulation of data on CANopen.

Normally, application data and parameters of a CANopen device are present in the CANopen as objects, which are implemented in a CANopen object dictionary 76 as part of a CANopen stack 78, as is shown in FIG. 3.

If, however, an application has more data or parameters than are present in the CANopen object dictionary 76, such information cannot be accessed via the CANopen network 20, 22.

According to the present invention, a method is proposed for encapsulating data which allows transparent access to all data and parameters of the CANopen device 24, regardless of whether or not the former are contained in the object dictionary 76.

To carry out the method according to the present invention an object "data tunnel object" (DTO) 80 is defined which is implemented in the object dictionary 76 of the CANopen stack 78 of a CANopen slave 82. The data and parameter prepared by the objects of the object dictionary 76 can be saved in the memory 64 and are available for an application 84 which is executed, for example in the FIELDBUS device 24 by the microcontroller 58.

The transfer of data by encapsulation is based on the standardized SDO service (upload/download) in the CANopen to the novel data tunnel object (DTO) 80 according to the present invention which resides in the CANopen slave. Depending on the amount of data to be transmitted, the CANopen stack 78 includes the data tunnel object (DTO) 80 as a suitable type of service data object (SDO), either expedited, segmented or—as in the case of a M30 master or S30 slave—as a block. The data tunnel object (DTO) 80 is transparent to the user.

Figure 4:
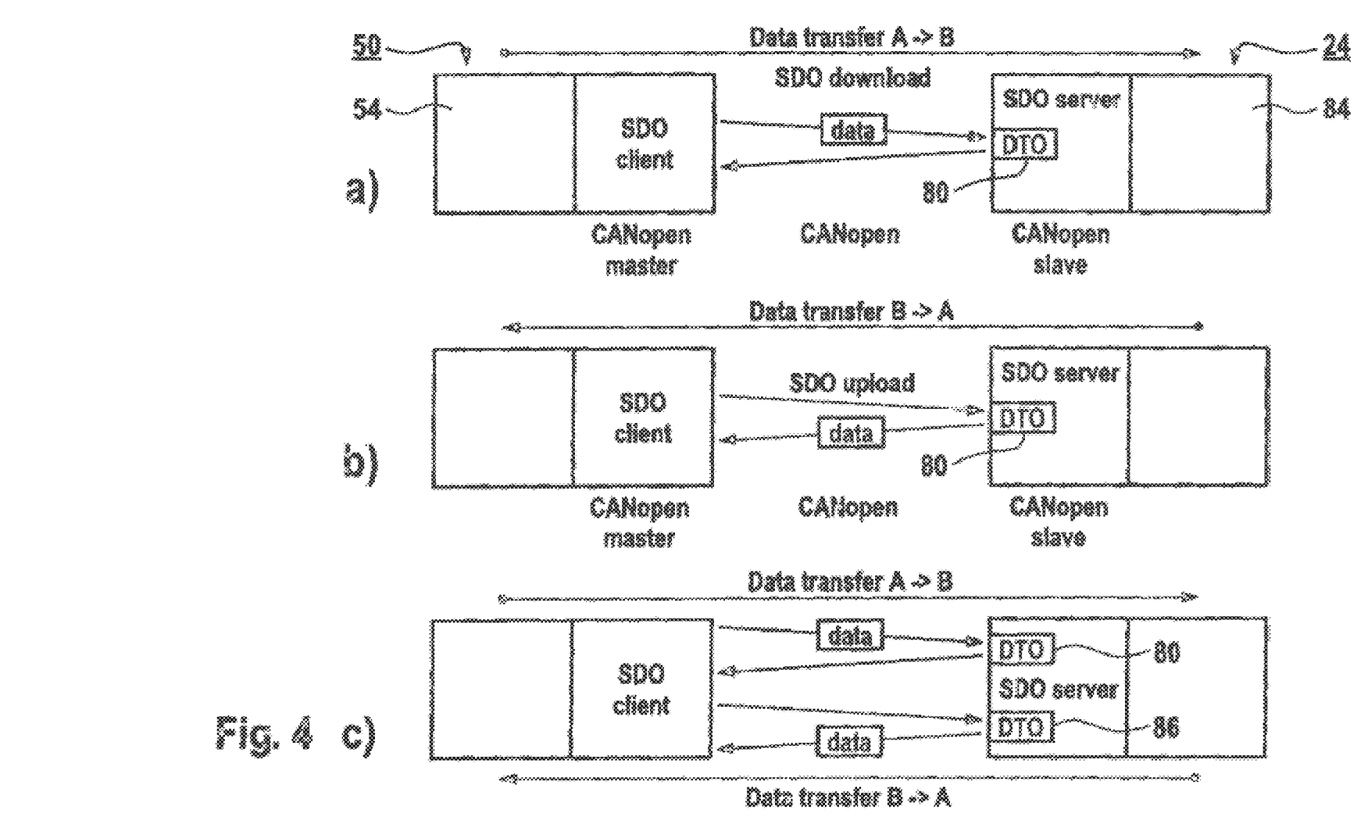
FIG. 4a-4c is a schematic representation of ways of transmitting encapsulated data via CANopen.

An example of a transparent data transmission via CANopen is shown in FIG. 4. In this case, the user PC 50 assumes the function of a CANopen master in which a SDO client and the operating software 54 are implemented. The fieldbus device 24 functions as a CANopen slave in which a SDO server and an application program 84 are implemented. The SDO server comprises the CANopen stack 78 and the object dictionary 76 with the implemented data tunnel object (DTO) 80.

In the case of a segment SDO or block SDO, the SDO service is split into multiple SDO request/response frames.

Based on the client/server structure the user PC 50 always initiates transmission with the SDO client:
Data transmission of application 54 to application 84 is executed with a SDO upload to DTO 80, which is also initiated by application A,
Data transmission of application 84 to application 54 is executed with a SDO upload from DTO 80, also initiated by application 54, whereby application 54 must cyclically address the application 84 in the usual manner (polling).

Since the transmissions of encapsulated data are standardized SDO transmissions, it is possible to use the preset (default) SDO server channel. Where the transmission of encapsulated data is intense, a second SDO server channel may be expedient, as is shown in FIG. 4c).

For a duplex or half-duplex data transmission a single data tunnel object (DTO) 80 is sufficient. Two data tunnel objects 80, 86 should be used for a full duplex transmission, as shown in FIG. 4c), that is, an independent transmission of application 54 to application 84 and simultaneous transmission of application 84 to application 54.

The "tunnel mechanism" described provides a means for transporting data blocks. The application 54 and the application 84 determine the exact use of the "tunnel", that is, for example, which types of data blocks are transmitted and which protocol is used.

In the case of field device tool (FDT) and/or device type manager (DTM) technology, this technology can be implemented in the application 54, through which via FDT and/or DTM a connection to a specific field device 24-40 is established on which the application 84 runs. The "tunnel" can be used to transparently transmit any standardized or private protocol that accepts the applications 54, 84.

The protocol-specific part of the device DTM must initiate transmission, particularly for a transmission of application 84 to application 54. The transmission is then carried out from the CANopen communication DTM in the form of a SDO upload request.

Figure 5:
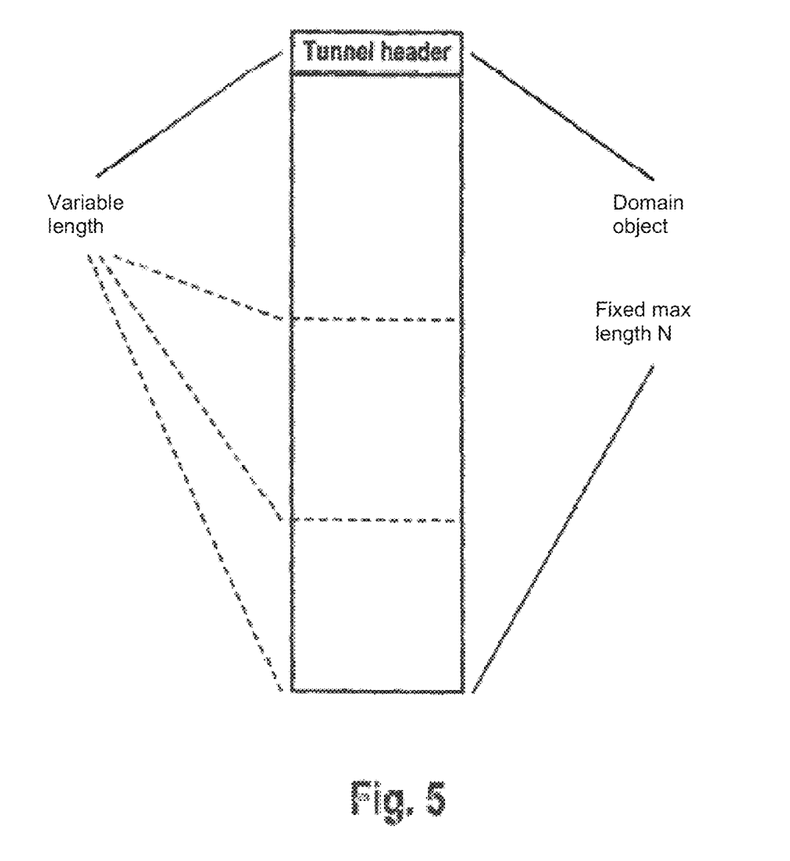
FIG. 5 is a structure of a data tunnel object.

The data tunnel object (DTO) 80 is of the "domain" type and is represented schematically in FIG. 5. This allows the transmission of data blocks of 1 to N bytes, in which the length of the blocks can vary from one transmission to the next. The length N of the domain object which is prepared in the object dictionary 76, limits the maximum number of data bytes per block. The length N is not specified here since it is a function of the respective application.

The first byte of the data block is always a tunnel header byte, as shown in FIG. 5.

Figure 6:
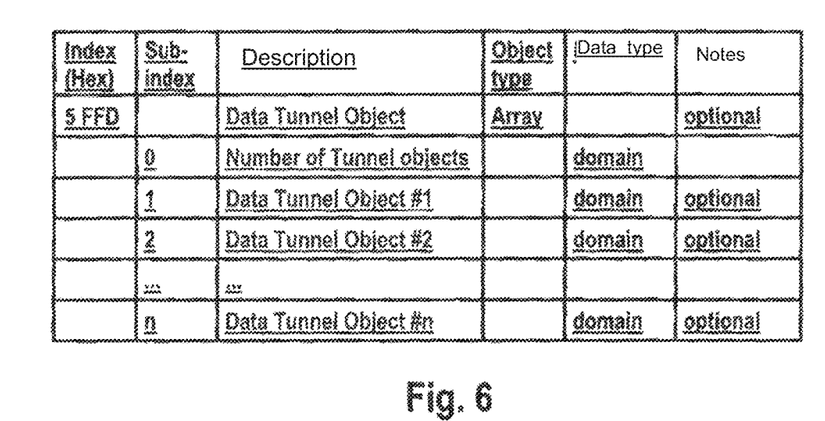
FIG. 6 is a table with individual data tunnel objects.

FIG. 6 shows a table for describing the data tunnel object 80. For example, assigned to the data tunnel object 80 is object index 5FFDh. Also assigned to data tunnel object is the object type "array" which allows various devices per tunnel object to be implemented. Mapping of the objects in a PDO (process data object) does not occur.

Figure 7:
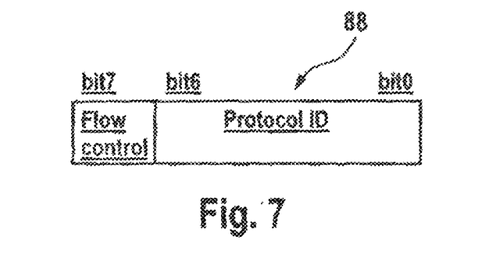
FIG. 7 is a bit sequence of a data block (tunnel header)

The first byte transmitted via the data tunnel object (DTO) is always the tunnel header byte 88 which is shown in FIG. 7. The tunnel header byte comprises a flow control bit and seven protocol ID bits.

The flow control bit can be used for a simple flow control. If the SDO server is unable to receive additional data blocks, it can display this situation by setting the bit to 1. If the protocol provided on the data bus (tunnel) provides the correct means for flow control, this bit may then be superfluous.

Flow control=0 (default): The server is able to receive additional data blocks
Flow control=1: The server is unable to receive additional data blocks
Protocol-ID: This field marks the type of protocol used on the tunnel. The information is useful for debugging and analysis-application purposes
Protocol-ID=00h: MODBUS RTU encapsulation, the data blocks contain MODBUS RTU frames
Protocol-ID=01h-3Fh: These IDs are reserved for standardized protocols
Protocol-ID=40h-7Fh: device-specific; these IDs can be used for non-standardized protocols.

Figure 8:
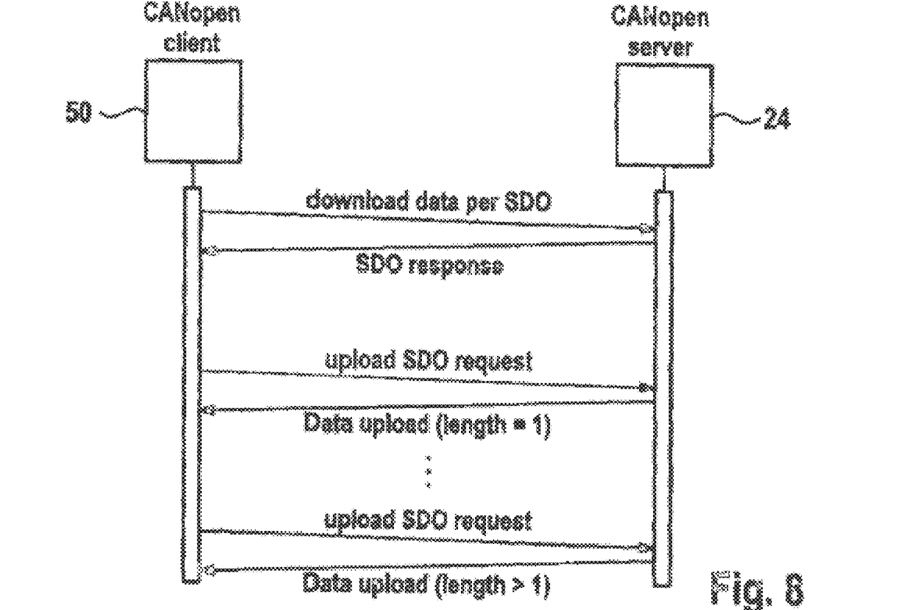
FIG. 8 is a schematic representation of a data transfer between CANopen client and CANopen server.

The tunnel mechanism according to the present invention allows the transmission of data blocks in both directions (up-/download), as is shown in FIG. 8. A download as well as an upload are both initiated by the CANopen client, in the present instance, from the user PC 50. This results from the client server structure of the SDO connection.

In the case of an upload the client must request the data block. A block length of 1 byte is an indication of an empty data block since in this case the block contains only the tunnel header byte 88.

If the data block is larger than 4 bytes, the segment transmission or block transmission is used. This occurs automatically by way of the CANopen stack 78 and the user application 84 does not need to be involved.

Figure 9:
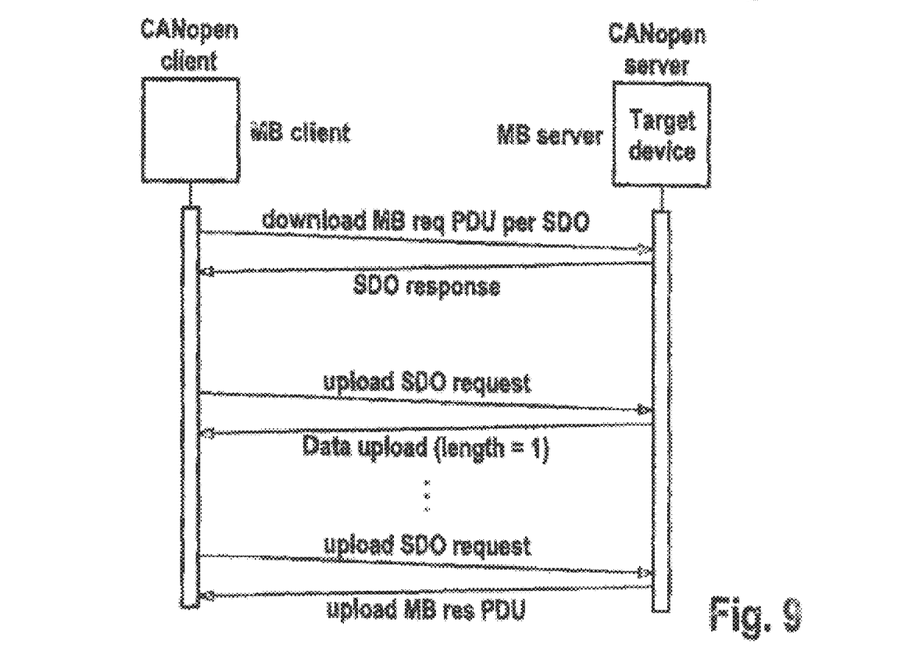
FIG. 9 is a schematic representation of a data transfer as exemplified by an encapsulated MODBUS frame.

FIG. 9 shows purely schematically the encapsulation of a MODBUS message or of MODBUS data. In this case only one data tunnel object (DTO) 80 is used. The transmitted data blocks comprise MODBUS-RTU frames. The flow control bit of the tunnel header 88 is not used in this case.

A MODBUS transaction always consists of one of the requests sent from the client 50 and one of the responses sent from the server 24. An exception to this rule is a request broadcast address 0, in which the response is omitted. The transaction begins with the transmission of the MODBUS request to the fieldbus device 24 by way of a SDO download (command: download MB REQUEST PDU PER SDO). Next the MODBUS client requests a MODBUS response (SDO response). If the fieldbus device does not immediately have the MODBUS response ready, the uploaded data block consists of just the tunnel header 88 and thus has a length of 1. The request (polling) is repeated until the MODBUS response is received.

MODBUS-RTU frames are limited to 254 bytes such that the 255 byte length for the domain object should be sufficient. However, the domains can also be smaller, depending on the supported MODBUS-functions.

The MODBUS client does not have to reside in the CANopen client. In the case of a remote MODBUS client the CANopen client can forward the appropriate frames.

FIG. 9 is a schematic representation of a frame. In the case of segment SDO or block SDO, multiple SDO frames not shown here are transmitted.

Figure 10:
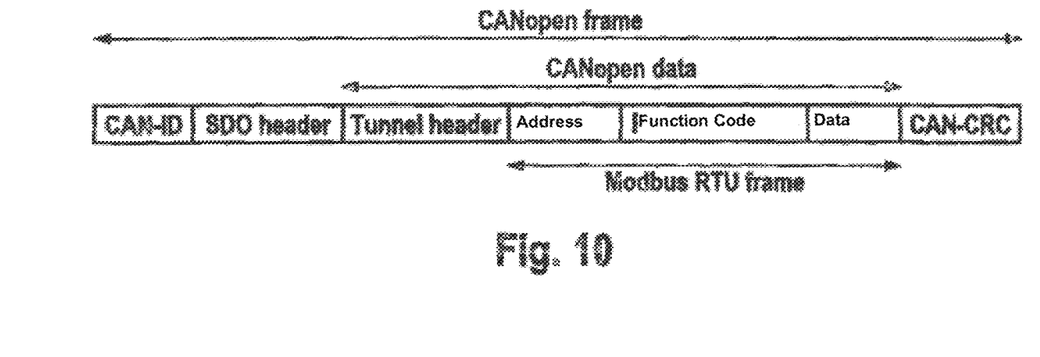
FIG. 10 is a CANopen frame with encapsulated MODBUS-RTU frame.

FIG. 10 shows a MODBUS-RTU frame as part of a CANopen frame. The MODBUS-RTU frame is composed of an address (1 byte), function code (1 byte) and data field (N bytes).

Based on this structure, standard MODBUS frames must be used that have at least 7 CANopen data bytes (tunnel header, address, function code), 4 bytes for start address and length (segment or block SDO).

However, MODBUS exception frames may have only 4 CANopen data bytes, namely tunnel header, address, function code and a byte error code. In such case it is also possible to use "expedited" SDO. It depends on the server device whether it responds with an "expedited" or segment SDO to a SDO upload request.

If the target device, in this case the field device 24 or the controller 12, provides an internal routing functionality, the message can then be sent to the assigned address, taking into account the MODBUS address rules. If, for example, the address is set at 00 or if the address does not exist, then there is no response.

If the CANopen fieldbus device or the CANopen controller does not provide such a routing functionality, then the address field has no significance.

By using the aforementioned tunnel mechanism, it is possible to configure or parameterize the fieldbus devices 24-40 shown in FIG. 1 in just one step, that is, with one command from a central location such as user computer 50 or controller 12, 14. In this configuration the controller 12, 14 can have an internal routing functionality so that the MODBUS message can be sent to the appropriate address of the fieldbus device, taking into consideration the address rules.

Thus, it is possible to load the entire controller program as well as the hardware configuration of the fieldbus devices 24-40 via the single connection 52 between the user PC 50 and the controller 12.

A system for integrating the fieldbus devices in an automation system is therefore provided, which comprises multiple fieldbus devices that are connected via communication links for controlling and monitoring a technical facility.

The fieldbus devices are connected via the at least one fieldbus 20 and 22 and can be (but do not have to be) connected to the control unit or controller 12, 14.

According to the present invention there is a parameterization and/or configuration software which runs on the user PC, namely for configuring and/or parameterizing the individual field devices 24-40, which are configured to allow the data of the individual field device to be stored.

Furthermore, a single program software runs on the user PC 50 for configuring and/or programming the controller 12, 14.

The programming software that runs on the user PC 50 for configuring and/or programming the controller 12, 14 is capable of starting the parameterizing software in hiding mode. With the software, it is possible to configure and/or program the respective FIELDBUS devices. Further, a direct communication connection is established between the user PC 50 and the fieldbus devices 24-40 via the controller 12, in order to store the entire data configuration of the fieldbus devices in the fieldbus devices 24-40. This is executed sequentially for each fieldbus device and as well as each time a fieldbus device is attached to the fieldbus (CANopen) 20, 22.

The controllers 12, 14 do not need a buffer in order to create a copy of the data for configuring the fieldbus devices. Instead, the fieldbus device is capable of accepting a direct communication with the parameterizing software in order to execute a configuration and/or parameterization of each fieldbus device in the same amount of time the controllers 12, 14 need for monitoring, operating and diagnosing each of said fieldbus devices.

For downloading with just "one click" the complete fieldbus device configuration in each fieldbus device connected to the network, it is not necessary to store information on the fieldbus device configuration in the controllers 12, 14. Instead, all fieldbus device configurations are downloaded in one step, that is, with one click.

Figure 11:
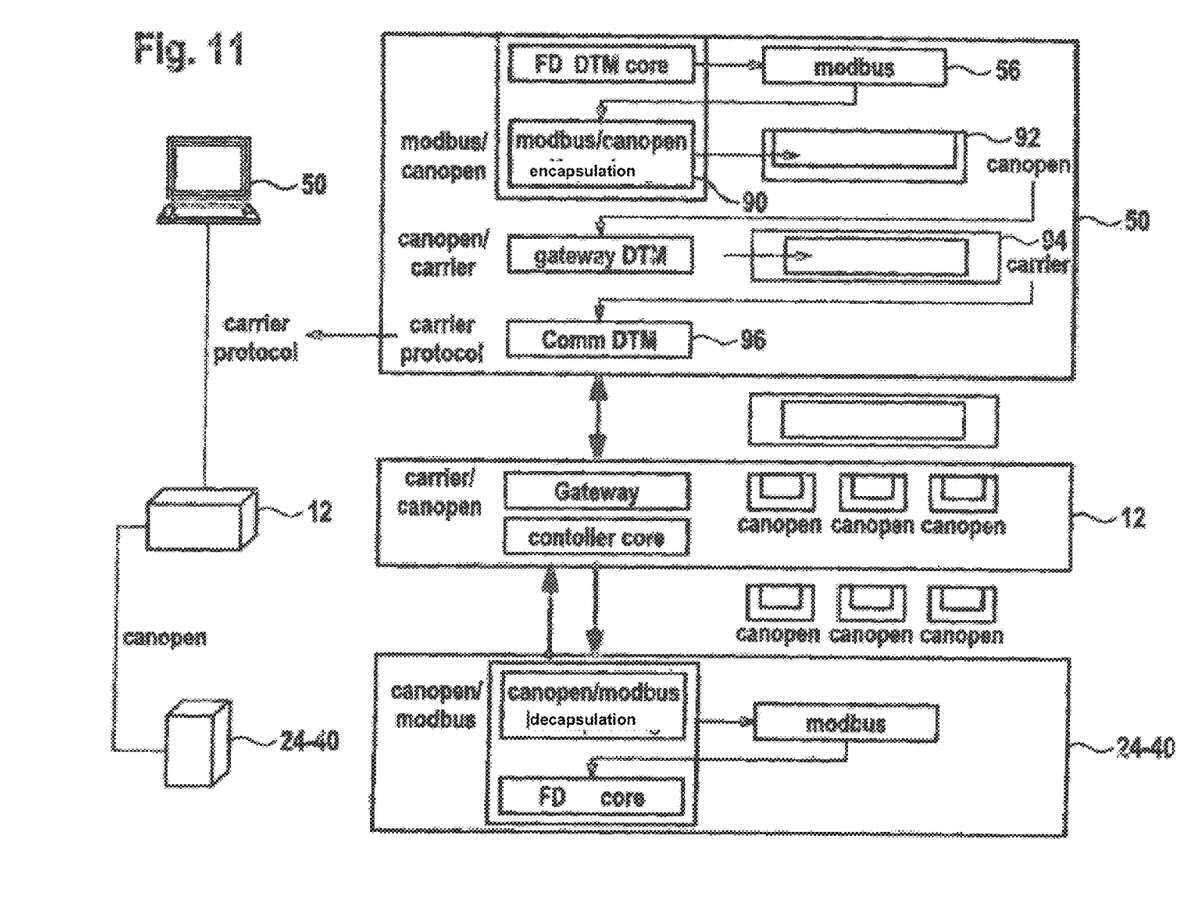
FIG. 11 is a structure of an automation device with data encapsulation via multiple levels.

An application of the above described data tunnel mechanism to the structure shown in FIG. 1 is discussed with reference to FIG. 11. In the user PC 50 a software (FD DTM Core) is implemented with which the device description file 56 can be generated in MODBUS format. In addition, a software tool 90 is provided for encapsulating the MODBUS message in a CANopen message for purposes of generating a CANopen frame 92, which can be transmitted, for example via a CANopen bus. In the exemplary embodiment shown, a further encapsulation of the CANopen frame in a carrier frame 94 occurs in order to transmit the MODBUS frame via a carrier protocol to the controller 12. For this purpose, the configuration tool 50 includes an interface (COMMDTM) 96.

The CANopen frames are encapsulated in the controller 12 and, as part of the routing function, are forwarded to each of the fieldbus devices with the corresponding addresses.

Implemented in the fieldbus device 24-40 is a CANopen MODBUS retriever, which encapsulates the MODBUS frame, which frame can then be interpreted and executed by a MODBUS interface (FD CORE) of each field device.

The invention claimed is:

1. A method for configuring at least one field device having a MODBUS server by transmitting configuration data between a configuration personal computer (PC) and the at least one field device via a CANopen bus,
   wherein the configuration PC comprises a configuration application having a field device tool, and at least one device type manager with which the configuration data are generated in a form of MODBUS frames, the method comprising the steps of:
   sending a download request or an upload request, based on a standardized service data object (SDO) service in a form of an SDO download or an SDO upload, to an SDO server, which is implemented in the at least one field device, by using an SDO client, which is implemented in the configuration PC;
   encapsulating the MODBUS frames in a CANopen frame by the configuration application implemented in the configuration PC;
   loading the CANopen frame with the encapsulated configuration data by means of the SDO service download into an object defined as a data tunnel object, which is implemented in an object dictionary of a CANopen stack of the SDO server of the at least one field device, wherein the data tunnel object prepared by the object dictionary are stored in a memory and are available for a field device application, which allows transparent access to all data of the field device;
   wherein a direct communication connection between the configuration PC and the at least one field device is established in order to store all configuration data of the field device in the field device;
   decapsulating the encapsulated MODBUS frames out of the CANopen frames by an application implemented in the field device; and
   wherein a data transmission is carried out from the at least one field device to the configuration PC by way of the SDO upload from a data tunnel object, initiated by the configuration application implemented in the configuration PC, wherein the configuration application cyclically addresses the field device application implemented in the at least one field device.

2. The method according to claim 1, wherein a data transmission is carried out from the configuration PC to the at least one field device by way of the SDO download to the data tunnel object of the object dictionary, initiated by the configuration application implemented in the configuration PC.

3. The method according to claim 1, wherein a preset SDO server channel is used for data transmission, and wherein a second SDO server channel is used in an event of a high data volume.

4. The method according to claim 1, wherein a single data tunnel object is sufficient for simplex or half-duplex data transmission.

5. The method according to claim 1, wherein, for a full-duplex data transmission, at least two data tunnel objects in the object dictionary of the SDO server are used.

6. The method according to claim 1, wherein, during a transmission of the configuration data from the at least one field device to the configuration PC, a protocol-specific part of the device type manager implemented in the configuration PC must regularly query the at least one field device with the field device application, whereby a CANopen communication the device type manager implemented in the field device executes the SDO upload request.

7. The method according to claim 1, wherein the data tunnel object is of a domain type.

8. The method according to claim 1, wherein the CANopen frame with the encapsulated MODBUS frame is sent via a routing functionality implemented in the configuration PC to the at least one field device with an appropriate address.

9. The method according to claim 1, wherein encapsulated data are transmitted in a form of control programs.

10. The method according to claim 1, wherein the data transmission is carried out sequentially for each of the field devices, or is carried out when one of the field devices is attached to the CANopen bus, or both sequentially for each of the field devices and when one of the field devices is attached to the CANopen bus.

* * * * *